April 16, 1974  G. L. RICHARD ET AL  3,804,734

METHOD FOR REDUCING EMBRITTLEMENT CONDITION OF METALS

Filed April 19, 1972

INVENTORS
ROBERT W. BLOSSER &
GORDON L. RICHARD

BY
*Dunlap, Laney, Hessin & Dougherty*
ATTORNEYS

United States Patent Office 3,804,734
Patented Apr. 16, 1974

3,804,734
METHOD FOR REDUCING EMBRITTLEMENT CONDITION OF METALS
Gordon L. Richard, 217 W. Coe, and Robert W. Blosser, 3620 Oak Grove Drive, both of Midwest City, Okla. 73110
Continuation-in-part of abandoned application Ser. No. 844,579, July 24, 1969. This application April 19, 1972, Ser. No. 245,643
Int. Cl. B01j 1/10
U.S. Cl. 204—157.1 H
12 Claims

ABSTRACT OF THE DISCLOSURE

A method for reducing the condition of embrittlement in a metal specimen by irradiating the specimen with a neutron flux of selected density. The method consists of placing a metal specimen in view of neutron radiation for a pre-determined period of time in order to alleviate any embrittlement condition and/or to reduce likelihood of such condition at a later time, such neutron irradiation tending to rearrange the interstitial makeup of the metal specimen, e.g. by bringing about dissociation of diatomic or molecular hydrogen to its monatomic state.

CROSS-REFERENCE TO RELATED APPLICATION

The present invention constitutes continuation-in-part subject matter related to co-pending patent application Ser. No. 844,579 entitled "Method for Reducing Embrittlement Condition of Metals" as filed on July 24, 1969 and now abandoned, in the name of the present inventors.

BACKGROUND OF THE PRESENT INVENTION

(1) Field of the invention

The invention relates generally to the treatment of metals for alleviation of weakening condition and, more particularly, but not by way of limitation, it relates to a method for combating embrittlement condition of metals.

(2) Description of the prior art

The prior attempts at alleviation of metal embrittlement conditions have been largely confined to various types of heat treatment. That is, an approach wherein increased heat is applied to the metal specimen in an attempt to drive hydrogen out of its substance. Such removal of hydrogen was effected through dissociation and diffusion as a result of baking of the metal specimen for a predetermined time at a selected temperature, and such procedure was necessarily time consuming. The prior art heat treating or baking processes required baking of a specimen at the highest possible temperature, thereby to reduce the time required as much as possible, but various temperature limitations were to be observed in order not to damage prior instilled desirable heat treatment properties. Aside from the prior types of heat application processes, the only other avenues appear to be various attempts at complete avoidance of the hydrogen or other embrittlement condition in the first place. This may cause severe limitation in availability of treating processes, or it may necessitate an initial barrier coating deposition.

SUMMARY OF THE INVENTION

The present invention contemplates a method of treating metals to remove embrittlement conditions. In a more limited aspect, the invention consists of irradiating a metal specimen in a neutron flux of pre-determined density in order to remove or alter the atomic structure of the embrittlement-causing hydrogen from the substance of the metal specimen.

Therefore, it is an object of the present invention to provide a method for reducing probability of embrittlement failure of a metal more quickly than has been possible in prior known processing systems.

It is also an object of the invention to provide an embrittlement combatting method capable of reducing production costs surrounding manufacture, maintenance or re-conditioning of selected metal objects.

Finally, it is an object of the present invention to provide a method for the alleviation of hydrogen embrittlement in non-destructive manner utilizing neutron radiation capable of permeating the physical structure of the metal to remove or alter embrittlement-causing molecules and/or ions.

Other objects and advantages of the invention will be evident from the following detailed description when read in conjunction with the accompanying drawing which illustrates the invention.

DETAILED DESCRIPTION OF THE PREFERRED EMBODIMENT

Figure 1:
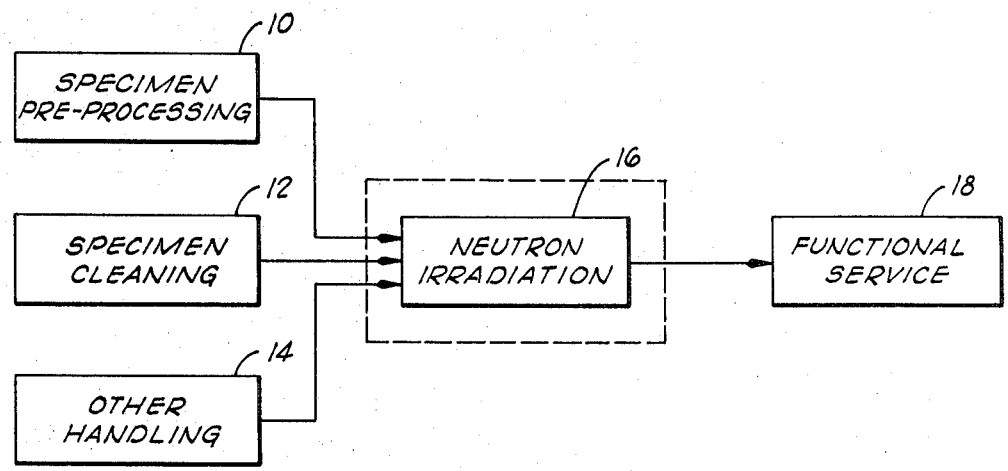
FIG. 1 is a functional diagram illustrating various steps in the method of the invention.

The condition of embrittlement of metals, particularly hydrogen embrittlement in high performance, high reliability metal structures, has today become a problem of some magnitude in certain areas of industry and technology. The condition of embrittlement is one, which highly increases the probability of stress failures in metal structures, but which is quite difficult of detection at any time prior to the actual failure, i.e. cracking, flaking or such of the metal structure. Such a condition becomes a particular hazard in any industry or endeavor wherein high reliability must be imposed upon metals making up essential structures, e.g. aircraft industry, pipeline industry, the shipping and building industries, to name only a few specific areas. Treatment with prior means generally consisting of high heat treating may be so time consuming as to be prohibitive in many applications. Further, hydrogen removal from such as titanium is impractical since it requires vacuum annealing at extremely high temperatures.

It is now known that certain treatment processes serve to hasten or bring about embrittlement conditions such that some form of embrittlement alleviating treatment is necessary in order to enable the initial metal processes. Thus, for example, hydrogen may be introduced during melting and entrapped during solidification of metals, or it may be picked up during heat treatment, electroplating, acid pickling, welding, and other processes as performed on metal specimens. Some form of embrittlement alleviating process becomes a necessity as a followup to certain of the above treatments, especially as employed in the fabrication or reconditioning of high reliability metal structures. The present invention, as will be further described, is capable of rapid treatment to alleviate the embrittlement condition with minimal increase in production time costs, etc.

A commonly held concept of hydrogen embrittlement is that monatomic hydrogen precipitates at internal voids as molecular or diatomic hydrogen. Such voids may be true voids, microcracks, or they may simply be regions of high dislocation density. While the above is merely a basic idea of hydrogen embrittlement, it should be understood that there are many more facets of the phenomena to be considered in gaining complete information as to the stress and fracture occurrences; however, the basic physical characteristics of the phenomena are ascertained to a sufficient extent to support a more or less general definition of the present method. While all of the nuclear and interstitial events of the process would be difficult of explanation, the basic interaction of matter may be set forth in well-known terms and relationships.

A severe embrittlement condition can be produced in various metals by the presence of but very small amounts of hydrogen. Finding support is the fact that those metal structures of the body-centered cubic type and the hexagonal close structured types are the most susceptible to hydrogen embrittlement. As little as .0001 weight percent of hydrogen can cause cracking or, at least, great reduction in ductility of steel. Hydrogen, being a small atom, is present in solution as monoatomic hydrogen, and is capable of diffusing voids and interstitials of a metal structure very rapidly, especially at increased temperatures. The most commonly held concept is that the monatomic hydrogen precipitates at the internal void positions as molecular or diatomic hydrogen to bring about the hydrogen embrittlement. Thus, when critical hydrogen concentration is obtained, a crack or weak point of the metal arises. Such embrittlement condition may show up as either cracks or flakes of the metal, depending upon the basic physical structure of the metal itself at the point of embrittlement.

It appears that all ferritic steel may be subject to hydrogen embrittlement to some degree, and, generally, the variations in degree can be correlated to the composition and micro-structure of the particular steel. In addition, various other metals and metal alloys may be subject to diffusive hydrogen action and embrittlement in varying degree, and embrittlement alleviation will often be desirable relative to many metal working operations. The hydrogen embrittlement may be found in such as iron, iron alloys, copper, aluminum, titanium, and still other metals and alloys of metals too numerous to itemize.

In accordance with the present invention, a metal specimen can be irradiated with a suitable intensity of neutron flux to remove or greatly reduce the damaging hydrogen content of the specimen, and this irradiation will not appreciably alter any other mechanical or physical properties of the metal specimen. Thus, as shown in FIG. 1, metal structure having a possible embrittlement condition may be derived from any of a specimen pre-processing 10, specimen cleaning 12, or other specimen handling stage for introduction through a neutron irradiation step 16. After neutron irradiation of sufficient time and intensity, as determined in accordance with the size and shape of the specimen and other statistics pertaining to severity of embrittlement, this specimen can then be passed on or replaced in functional service step 18.

To take merely one example, for purposes of illustration, an aircraft landing gear component may be passed through specimen cleaning 12 which includes paint removal through chemical means, plating removal through electrolytic means, pickling and replating, any of such processes being known contributors to the embrittlement condition; and, thereafter, the metal part is passed through the neutron irradiation step 16 for a pre-determined time before return to functional service step 18, i.e. reassembly into the particular landing gear structure.

The neutron has special properties which make it particularly suitable for such irradiation usage. The neutron has essentially the same mass as a proton but it has no electric charge, and this precludes acceleration of deflection by electric or magnetic fields as well as inhibition by such as a coulomb barrier. Thus, even the very slow neutrons can move about within electron shells of atoms since they have but very small interaction with electrons present therein.

Due to the operation of the above properties, the tightest structure of matter, in this instance, metal solids, is quite open to the neutron. Even the more crystalline solids with densely packed and tightly bound atoms are quite easily penetrated to relatively great depths by the neutron. When a neutron passes through matter such as this, it interacts with native nuclei of the matter in one of two dominant manners; that is, neutron radiative capture $(n, \gamma)$ or elastic collisions between the neutron and the nuclei of the matter. For most structural metals with which the process is concerned, the radiative capture cross-section is so small that the primary interaction can be relied upon as that of the neutrons interacting with the nuclei of the matter.

In such elastic collisions, the greatest transfer of kinetic energy from one to the other particle occurs when the two particles have equal masses. Therefore, since protons and neutrons have nearly equal masses, the neutron can transfer a large percentage of energy to the proton upon collision. In contrast to this, a neutron upon colliding with a heavy nucleus such as that of most structural metals can transfer only a very small percentage of its energy to the heavy nucleus. The neutron will then rebound from such a collision, retaining most of its original energy, then to proceed along a new path until another collision occurs. Such a process may recur repeatedly before the neutron losses as a significant portion of its initial kinetic energy.

When hydrogen is present within the interstitial spaces of the specimen matter, collisions between a bombarding neutron and a hydrogen nucleus (proton) are possible. Such collisions can supply the necessary energy which is required to separate diatomic hydrogen into two free protons, while also imparting significant kinetic energy to these protons. For diatomic hydrogen, the dissociation energy is equal to 4.48 electron volts. The binding energy of an electron and a proton forming a hydrogen atom has been shown experimentally to be equal to 13.58 electron volts. Thus, the binding energy, and the dissociation energy (the total energy required to separate diatomic hydrogen into two free protons of hydrogen nuclei), is equal to 18.06 electron volts.

Elastic collisions between a bombarding neutron and a hydrogen nucleus or proton can provide the necessary 18.06 electron volts which are required to separate the diatomic hydrogen into two free protons. Thus, when a neutron flux impinges upon a solid, such as a selected metallic specimen, the majority of the neutrons will enter the metal specimen and progress through the solid such that their net displacement is away from the neutron source. Hydrogen atoms which are entrapped within the solid will experience neutron collisions, and in those collisions wherein the energy transfer is high enough, the atoms will be ionized and caused to move in the general direction of the neutron flux.

A continuation of the irradiation for a sufficient period of time will cause most of the hydrogen in a metal specimen to migrate out of the solid along the direction of the neutron flux radiation. The time required to reach a desired degree of freedom from the hydrogen will depend upon the flux density and energy spectrum. It will also depend upon the physical properties of the metal specimen for which the hydrogen is being removed. The quantity of hydrogen $Q_t$ remaining in a given item after a process time $t$ will take the following form:

$$Q_t + Q_o e^{-kt}$$

wherein the constant $k$ is determined by the neutron flux density and energy spectrum as considered with the mechanical and physical properties of the particular metal specimen, and $Q_o$ is equal to the original quantity of hydrogen present in the specimen.

Figure 2:
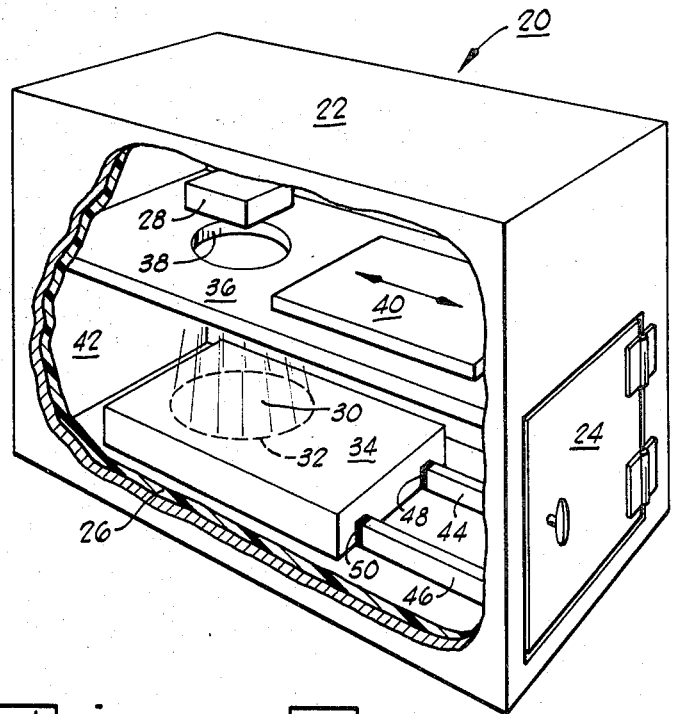
FIG. 2 is a perspective view, with parts shown in cutaway, of one form of apparatus which is suitable for carrying out the method of the invention.

The method of the invention may be carried out in such as an apparatus 20 which is shown in FIG. 2. The apparatus 20 may consist of any suitable enclosure such as rectangular enclosure 22 preferably having an access or door 24 provided therein. Enclosure 22 may be formed from a rigid structural material which is internally lined by a suitable neutron absorptive shielding layer 26, e.g.

polyethylene or other shielding material which exhibits the desired impervious quality to neutron radiation.

A neutron source 28 may be positioned within enclosure 22 in position to emit radiation 30 for continuous coverage over an area 32 on a supporting base 34. A shielding panel 36, e.g. a polyethylene or other neutron absorptive slab may be supported across the closure 22 to define an aperture 38 through which radiation 30 from source 28 is directed towards area 32. A sliding shutter 40, also construction of neutron absorptive material, is positioned for manipulation to close up aperture 28 during times when a metal specimen is being changed, turned, or otherwise moved in a lower irradiation chamber 42.

The supporting base 34 may be any suitable structure upon which the metal specimen may be rested or otherwise secured, and such base 34 may be made slidable for access through door 24, e.g. slidable along such as a pair of rails 44 and 46 in coaction with slide ways or grooves 48 and 50, respectively. It should be understood that the irradiation chamber 42 may include any of various mechanisms which facilitate insertion and removal, as well as periodic turning or moving, of the metal specimen prior to or during the irradiation periods. It may also contain a hydrogen free purge gas such as nitrogen. The general size and shape of the specimen undergoing irradiation will bear greatly upon the size and type of facility employed as the shielded neutron irradiation enclosure and its supporting members.

An electrostatic field may be employed to preclude reabsorption of hydrogen ions (protons) which have been driven out of the metal specimen, and hydrogen ions which have been generated due to the neutron flux acting upon any hydrogen which may be present in the atmosphere surrounding the specimen. This electrostatic field may be produced by charging the specimen to a high positive potential relative to the enclosure or to a suitable cathode within the enclosure.

The neutron source 28 may be any of various commercially available neutron sources which emit the desired density of radiation for the particular application. For low intensity usage, it may be sufficient to employ a well-known form of radium-beryllium, americium-beryllium, etc. source. For still other applications requiring very high energy neutrons on the order of 2 bev., or other energy source of commercially available type. Still other sources are available such as photo-distintegration reaction, nuclear reactions through accelerated charged particle collisions, a deuteron stripping reaction, etc.

The method of the invention was carried out in a series of test procedures wherein metal specimens of a standardized proof test type were subjected to induced brittlement condition and then subjected to the present method to bring about de-embrittlement. The metallic test specimens are a commercially available test strip known as the "HEP" (Hydrogen Embrittlement Proof) strips, as manufactured by the Chemical Corporation, 57 Waltham Ave., Springfield, Mass.

The HEP strips are comprised of a metal alloy which has a very high sensitivity to hydrogen embrittlement. The strips are normally used as an indicator during such as a plating operation to determine the extent of hydrogen embrittlement which might be incurred by each vat of items being plated. Thus, the HEP strips are processed along with the items being plated, and are then loaded into a test fixture which produces a static bending load. The time to break is then an indication of the amount of hydrogen absorbed by the item during the plating operation. Further information as to the metallic composition of the HEP strips and the particular static loading fixture are available with reference to U.S. Pat. No. 3,455,152.

The pilot testing of the present invention consisted of using fifty HEP strips in ten different testing procedures of five strips each. The testing consisted of the following steps:

(a) Pre-cleaning the HEP strips.—The test strips were de-greased in acetone and then scrubbed in a detergent solution. The strips were then washed in running tap water, air dried and again washed in acetone.

(b) Cathodic charging.—The HEP strips, those which were to be embrittled with hydrogen, were placed in a 0.75 normal sodium hydroxide solution and cathodically charged at 16 amperes per square foot for a specified time period, i.e. 1.5 hours.

(c) Neutron irradiation.—The HEP strips, those which were to receive neutron irradiation, were irradiated in a gas tight enclosure which was continuously purged with dry atmosphere. The dry atmosphere purge gas was produced by passing shop air through activated silica gel and then into the irradiation enclosure. A flow rate of approximately two standard cubic feet per minute was maintained during the irradiation process.

The specimens or HEP strips were mounted upon a rack within the enclosure such that they approximately formed a segment of the surface of a cylinder with a 12" diameter. The neutron source was then located at the midpoint of the axis of the defined cylinder. The particular form of neutron source used was a radium-beryllium sealed source as manufactured by Monsanto Inc. This type of source is normally used in a Troxler Electronic Laboratories, Inc. Model 104 moisture gauge.

The particular source utilized was manufactured in October 1965, and at that time had a specified neutron output of $4.43 \times 10^4$ neutrons per second. Since the specified half-life for this source is 1,620 years, it is reasonable to assume that this activity is not appreciably diminished at this time. The neutron flux produced by this source has a spherical pattern, thus a one-inch square on the surface of a 12" diameter sphere with the source at its center would have a neutron flux of approximately 98 neutrons per second. This will very closely approximate the flux impinging upon the test specimens as they were mounted upon the holding rack within the irradiation enclosure.

Static load testing of the individual HEP strips was carried out utilizing a loading test fixture as is the subject of the above-mentioned U.S. Pat. No. 3,455,152. The static load testing machine is a commercially available device which is utilized for deriving embrittlement indication in various segments of industry. HEP strips to be tested are placed in the fixture such that they are held in abowed or U-shape with the tips 3.5 inches apart. Pressure is applied only at the ends of the strips, in accordance with manufacturer's recommendation for various applications. The HEP strips are of a standardized size 7½" long, 7/16" wide, and of varying thicknesses depending upon the exigencies of application, a .020" thickness being utilized in the present application.

The HEP strips were processed in batches of five strips, each batch being subjected to significantly different test parameters. A total of fifty strips or ten batches of five strips were utilized, and all batches were pre-processed through the same pre-cleaning operation (aforedescribed) immediately before cathodic charging.

TEST NO. 1

Five test strips were pre-cleaned and loaded directly into the static load test fixture without cathodic charging or neutron irradiation. These specimens were left under static load for 336 hours, during which time none failed.

TEST NO. 2

Five HEP test strips were pre-cleaned and then cathodically charged at 16 amperes per square foot for 1.5 hours. The test strips were then removed from the charging tank, cleaned in running tap water and air dried with forced air for placement in the static loading fixture. A first specimen failed after 36 minutes, a second specimen failed after 67 minutes, a third specimen failed after 77 minutes, a fourth specimen failed after 217 minutes, and a fifth specimen remained in the static loading fixture for several hours during which time it did not fail.

TEST NO. 3

The test strips were pre-cleaned, cathodically charged at 16 amperes per square foot for 1.5 hours, re-cleaned in running water and forced air dried, and subjected to neutron irradiation for one hour. A first specimen failed after 72 minutes, a second specimen failed after 83 minutes, a third specimen failed after 87 minutes, a fourth specimen failed after 105 minutes, and the fifth specimen failed after 117 minutes.

TEST NO. 4

Test strips for test No. 4 were subjected to the same initial procedures of pre-cleaning and cathodic charging except that they were subjected to neutron irradiation for two hours. Static load testing of these five specimens resulted in the following:

The first specimen failed after 114 minutes; the second specimen failed after 132 minutes; the third specimen failed after 157 minutes; the fourth specimen failed after 205 minutes; and the fifth specimen was left in the static loading fixture for 72 hours, but did not fail.

TEST NO. 5

The five test strips were subjected to the same pre-cleaning and cathodic charging except that they were subjected to neutron irradiation for a period of four hours. The times of failure are as follows:

First specimen—5.25 hours; second specimen—5.5 hours; third specimen—7.5 hours; fourth specimen—12 hours; and fifth specimen—18 hours.

TEST NO. 6

The test strips were similarly pre-cleaned and cathodically charged to receive neutron irradiation for a period of eight hours. The times of failure during static load testing were as follows:

Specimen No. 1—6 hours; and the remaining specimens 2 through 5 were left in the loading fixture for 168 hours during which time no more failures occurred.

TEST NO. 7

The test strips were subjected to the same pre-cleaning and cathodic charging plus neutron irradiation for a period of 12 hours. Each of the five test strips were left in the static load fixture for a period of two weeks, during which time there were no failures.

TEST NO. 8

The test strips were subjected to the same pre-cleaning and cathodic charging plus neutron irradiation for a period of 16 hours. Each of the five test strips were left in the static load fixture for a period of two weeks, during which time there were no failures.

TEST NO. 9

The test strips were subjected to the same pre-cleaning and cathodic charging plus neutron irradiation for a period of 24 hours. Each of the five test strips were left in the static load fixture for a period of two weeks, during which time there were no failures.

TEST NO. 10

The test strips were subjected to the same pre-cleaning and cathodic charging plus neutron irradiation for a period of 48 hours. Each of the five test strips were left in the static load fixture for a period of two weeks, during which time there were no failures.

Inspection of the data derived for tests Nos. 1 through 10 indicate the manner in which the hydrogen embrittlement condition of standardized test strips is greatly alleviated. With reference to test No. 1, it can be noted that the HEP test strips (initially embrittlement free) having no induced embrittlement and receiving no irradiation exhibited no failures for a period of 336 hours and would have continued under test by an unknown time. However, test No. 2 received induced embrittlement by cathodic charging and the specimens failed under static load testing in a relatively short time on the order of minutes.

Inspection of the data for tests Nos. 3 through 10 then indicates the increasing resistance to breakage under static load test in proportion to time of irradiation at a predetermined neutron flux rate; and results of tests Nos. 7 through 10 indicate that the metal test strips were completely restored to their high embrittlement resistance constituency. The test results show conclusively that the method of the invention serves to alleviate hydrogen embrittlement condition in metals to restore the metal specimens to their original physical characteristics enabling requisite stability and reliability.

The foregoing discloses a novel method for eliminating or alleviating the condition of embrittlement in certain metals. In particular, the method succeeds in enabling rapid reduction of embrittling hydrogen presence within the structure of metal specimens. Such a neutron irradiation method as disclosed herein offers a vastly more economical process wherein hydrogen embrittlement caused by metal treating conditions or processes can be eliminated or significantly reduced i.e. to an acceptable level.

Changes may be made in the combination and arrangement of steps as heretofore set forth in the specification and shown in the drawing; it being understood that changes may be made in the embodiments disclosed without departing from the spirit and scope of the invention.

What is claimed is:

1. A method for reducing hydrogen embrittlement condition of an embrittled metal specimen comprising the step of:
   irradiating the metal specimen with neutrons thereby increasing the ratio of monatomic hydrogen atoms to diatomic hydrogen molecules and alleviating the condition of embrittlement.
2. The method of claim 1 wherein said metal is ferritic steel.
3. The method of claim 1 wherein said metal is iron.
4. The method of claim 1 wherein said metal is a carbon-iron composition.
5. The method of claim 1 wherein said metal is copper.
6. A method as set forth in claim 1 wherein the metal is aluminum.
7. The method of claim 1 wherein the metal is an alloy of iron or aluminum.
8. The method of claim 1 wherein said metal is titanium.
9. The method of claim 1 which is further characterized in that:
   said step of irradiation is effected by positioning the metal specimen for impingement and permeation of neutrons within a neutron flux.
10. The method as set forth in claim 9 which is further characterized in that:
    said neutron flux is generated within a shielding enclosure which is impervious to neutrons.
11. The method as set forth in claim 9 wherein the metal is an alloy of copper.
12. The method of claim 1 which is further characterized in that:
    said metal is charged to a positive potential, producing an electrostatic field about the metal for accelerating hydrogen ions away from the metal.

References Cited
UNITED STATES PATENTS

| | | | |
|---|---|---|---|
| 3,310,395 | 3/1967 | Swartz et al. | 148—133 |
| 3,440,037 | 4/1969 | Martin et al. | 75—128 |
| 3,496,034 | 2/1970 | Alger et al. | 148—36 |

HOWARD C. WILLIAMS, Primary Examiner